(12) United States Patent
Wang et al.

(10) Patent No.: US 10,878,125 B2
(45) Date of Patent: Dec. 29, 2020

(54) PRIVACY PROTECTION BASED TRAINING SAMPLE GENERATION METHOD AND DEVICE

(71) Applicant: Advanced New Technologies Co., Ltd., Grand Cayman (KY)

(72) Inventors: Li Wang, Zhejiang (CN); Peilin Zhao, Zhejiang (CN); Jun Zhou, Zhejiang (CN); Xiaolong Li, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/734,643

(22) Filed: Jan. 6, 2020

(65) Prior Publication Data

US 2020/0143080 A1      May 7, 2020

Related U.S. Application Data

(63) Continuation of application No. PCT/CN2018/094786, filed on Jul. 6, 2018.

(30) Foreign Application Priority Data

Jul. 7, 2017    (CN) .......................... 2017 1 0552377

(51) Int. Cl.
     *G06F 21/62*      (2013.01)
     *G06N 20/00*      (2019.01)

(52) U.S. Cl.
     CPC ......... *G06F 21/6245* (2013.01); *G06N 20/00* (2019.01)

(58) Field of Classification Search
     CPC ............................. G06F 21/60; G06F 21/6245
     See application file for complete search history.

(56) References Cited

U.S. PATENT DOCUMENTS

| | | | |
|---|---|---|---|
| 2009/0187522 A1 | 7/2009 | Fung et al. | |
| 2009/0279694 A1* | 11/2009 | Takahashi | G06F 7/00 380/28 |
| 2015/0087335 A1* | 3/2015 | Wang | H04W 4/029 455/456.1 |

FOREIGN PATENT DOCUMENTS

| | | |
|---|---|---|
| CN | 102955946 A | 3/2013 |
| CN | 106709447 A | 5/2017 |
| CN | 106845510 A | 6/2017 |
| WO | WO 2016/061628 A1 | 4/2016 |

OTHER PUBLICATIONS

International Search Report in International Application No. PCT/CN2018/094786, dated Sep. 30, 2018.

(Continued)

*Primary Examiner* — Dao Q Ho
(74) *Attorney, Agent, or Firm* — Finnegan, Henderson, Farabow, Garrett & Dunner, L.L.P.

(57) ABSTRACT

A privacy protection based training sample generation method includes: generating n d-dimensional transform vectors π from original data to be mined, wherein the original data comprises m original samples, each original sample includes a d-dimensional original vector x and an output tag value y, m and d being natural numbers, and each transform vector π is determined by a sum of yx of a plurality of original samples randomly selected from the m original samples; and determining the n transform vectors π as training samples of a binary classification model.

3 Claims, 6 Drawing Sheets

(56) References Cited

OTHER PUBLICATIONS

Extended European Search Report for European Application No. 18828486.3, dated May 13, 2020.
Peng Xiaobing et al., *Research progress of privacy-preserving support vector machines*, Journal of Jiangsu University, vol. 38, No. 1, Jan. 2017, 8 pages.
Hongwei Liu et al., *Support vector machine privacy protection algorithm based on rotation disturbance*, Statistics and Decision, Issue 19, Oct. 2012, 4 pages.

\* cited by examiner

PRIVACY PROTECTION BASED TRAINING SAMPLE GENERATION METHOD AND DEVICE

CROSS-REFERENCE TO RELATED APPLICATIONS

This application is a continuation application of International Application No. PCT/CN2018/094786, filed on Jul. 6, 2018, which is based upon and claims priority to Chinese Patent Application No. 201710552377.1, filed on Jul. 7, 2017, the entire content of all of which is incorporated herein by reference.

TECHNICAL FIELD

The present specification relates to the technical field of data processing, and in particular to a privacy protection based training sample generation method and device.

TECHNICAL BACKGROUND

With the development and popularization of the Internet, various Internet-based activities are constantly generating data, and many enterprises, governments, and even individuals have a large amount of user data. Data mining technologies can find valuable knowledge, patterns, rules and other information from a large amount of data and provide auxiliary support for scientific research, business decision-making, process control, etc., thus becoming an important way of data utilization.

In some application scenarios, the data for raining contains a lot of sensitive information, such as data from the financial industry, data from government departments, and so on. How to protect the sensitive information as privacy in the process of data mining has become an issue of increasing concern.

SUMMARY

In one aspect, a privacy protection based training sample generation method includes: generating, by a processor, n d-dimensional transform vectors $\pi$ from original data to be mined, wherein the original data includes m original samples, each original sample includes a d-dimensional original vector x and an output tag value y, m and d being natural numbers, and each transform vector $\pi$ is determined by a sum of yx of a plurality of original samples randomly selected from the m original samples; and determining, by the processor, the n transform vectors $\pi$ as training samples of a binary classification model.

In one aspect, a privacy protection based binary classification model training method includes: obtaining, by a processor, n d-dimensional transform vectors $\pi$ as training samples, wherein each transform vector $\pi$ is determined by a sum of yx of a plurality of randomly selected original samples, each original sample is one of m samples of the original data, and each original sample includes a d-dimensional original vector x and an output tag value y, m and d being natural numbers; and training, by the processor, a binary classification model based on the training samples to obtain an outcome model.

In one aspect, a privacy protection based training sample generation device, includes a processor; and a memory for storing instructions executable by the processor; wherein the processor is configured to: generate n d-dimensional transform vectors $\pi$ from original data to he mined, wherein the original data includes m original samples, each original sample includes a d-dimensional original vector x and an output tag value y, m and d being natural numbers, and each transform vector $\pi$ is determined by a sum of yx of a plurality of original samples randomly selected from the m original samples; and determine the n transform vectors $\pi$ as training samples of a binary classification model.

In one aspect, a privacy protection based binary classification model training device, includes a processor; and a memory for storing instructions executable by the processor; wherein the processor is configured to: obtain n d-dimensional transform vectors $\pi$ as training samples, wherein each transform vector $\pi$ is determined by a sum of yx of a plurality of randomly selected original samples, each original sample is one of m samples of the original data, and each original sample includes a d-dimensional original vector x and an output tag value y, m and d being natural numbers; and train a binary classification model based on the training samples to obtain an outcome model.

In one aspect, a computer-readable storage medium storing thereon a computer program that, when executed by a processor of a device, causes the device to perform the privacy protection based training sample generation method.

In one aspect, a computer-readable storage medium storing thereon a computer program that, when executed by a processor of a device, causes the device to perform the privacy protection based binary classification model training method.

It may be seen from the above technical solutions that in some embodiments of the present specification, the original vectors x and the output tag values y in the m original samples are used, and the sum of a plurality of randomly selected yx is determined as a transform vector, so that an outcome model obtained through training a binary classification model with n transform vectors is consistent with that obtained through training with original data, without being affected by a random quantity; in addition, since each transform vector is generated from a plurality of original samples and a random quantity, it is difficult to restore the original data from the transform vectors. The embodiments of the present specification can provide good protection for privacy information and further can obtain the mining result consistent with that obtained by using the original data.

DETAILED DESCRIPTION

Embodiments of the present specification provide a novel privacy protection based training sample generation method and a novel privacy protection based binary classification model training method. From an d-dimensional original vectors x and output tag values y (in and d are natural numbers), n (n is a natural number) d-dimensional transform vectors π are randomly generated in such a way that a binary classification model that results in a least loss function based on transform vectors is a model that results in a least loss function based on original vectors and output tag values, and thus an outcome model obtained through training with the transform vectors may be used as the data mining result of the original data.

Embodiments of the present specification may be run on any computing and storage device, such as a mobile phone, a tablet PC, a PC (Personal Computer), a notebook computer, and a server; and functions in the embodiments of the present specification may also be implemented by mutual cooperation of logical nodes running on two or more devices.

In some embodiments of the present specification, the original data refers to training samples with output tag values, and the sample capacity is in, which means that an samples are included (the samples of the original data are referred to as original samples), and each original sample includes a d-dimensional original vector x and an output tag value y. Let, in an i-th (i is a natural number from 1 to m) original sample, the original vector is $x_i$, and the output tag value is $y_i$.

Figure 1:
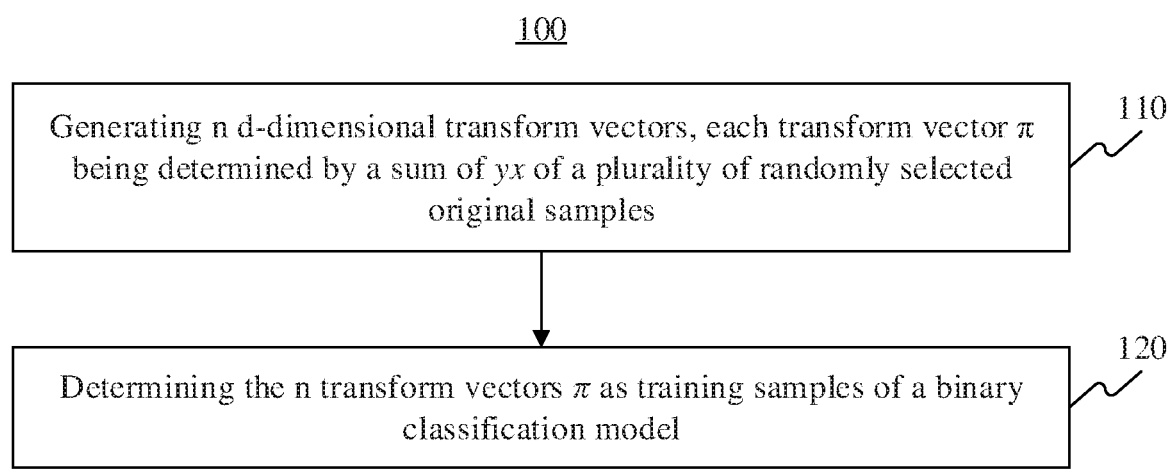
FIG. 1 is a flowchart of a privacy protection based training sample generation method according to an embodiment.

FIG. 1 is a flowchart of a privacy protection based training sample generation method 100, according to an embodiment.

In step 110, n d-dimensional transform vectors π are generated, wherein each transform vector π is determined by a sum of yx of 0 to m randomly selected original samples.

In m original samples, 0 to m original samples are randomly selected, and yx (i.e., y multiplying x) of each selected original sample is calculated, and the sum of these yx is determined as a transform vector π. The number of original samples selected each time may be fixed or random and is not limited.

Since each yx is a d-dimensional vector, the generated transform vector π is also a d-dimensional vector.

There are many specific ways to generate the transform vector π, which is not limited in the embodiments of the present specification, and the following two examples are described for explanation.

Example 1: In some application scenarios, plus and minus signs are used as the output tag values for binary classification, that is, the value of y is −v or v (v is a real number). In this case, a transform vector may be generated in the following way:

generating an m-dimensional vector σ, randomly determining −v or v as a value of each dimension of σ, and determining $\frac{1}{2}\Sigma_{i=1}^{m}(y_i+\sigma_i)x_i$ as a transform vector π, where $\sigma_i$ is the i-th dimension of the vector σ; and repeating the above process n times to obtain n transform vectors π.

Since $\frac{1}{2}(y_i+\sigma_i)$ is either 0 or transform $y_i$, the transform vector π may be a sum of yx of any 0 to m original samples.

In Example 1, let a linear model based on original data be:

$$Y(x)=\theta^T x \quad \text{Equation 1}$$

In Equation 1, $\theta^T$ is a d-dimensional weight vector, and then the loss function of a binary classification algorithm based on the original data is as shown in Equation 2:

$$F_{log}(S, \theta) = \frac{1}{m}\sum_i \log[1 + \exp(-y_i\theta^T x_i)] \quad \text{Equation 2}$$

In Equation 2, $S=\{(x_i, y_i)|i=1,2,\ldots,m\}$.

Let a linear model based on transform vectors be:

$$Y(\pi)=\theta^T \pi \quad \text{Equation 3}$$

Then, the loss function of a binary classification algorithm based on transform vectors is as shown in Equation 4:

$$F_{exp}^r(S, \theta, U) = \frac{1}{n}\sum_{\sigma \in U} \exp(-\theta^T \pi_\sigma), U \subseteq \sum_m \quad \text{Equation 4}$$

In Equation 4, $\pi_\sigma$ is a transform vector generated from σ, and $\Sigma_m = \{-v, +v\}^m$.

The case of v=1 is described below as an example to illustrate that there is a σ-independent linear relationship between $F_{log}(S,\theta)$ and $F_{exp}^r(S,\theta,U)$, which is derived as follows:

Definition: $\tilde{\pi}=\sigma_i\rho_i x_i, \forall \sigma \varepsilon \Sigma_m$, and a transform vector $\pi_\sigma$ may be expressed as: $\pi_\sigma = \frac{1}{2}(\tilde{\pi}_\sigma + \tilde{\pi}_y)$, then the following equations are established:

$$F_{log}(S, \theta) = \frac{1}{m}\sum_i \log(1 + \exp(-y_i\theta^T x_i))$$

$$= \frac{1}{m}\sum_i \log\left(\sum_{y \in \{-1,1\}} \exp\left(\frac{1}{2} \cdot y_i\theta^T x_i\right)\right) - \frac{1}{m} \cdot \frac{1}{2} \cdot \theta^T \tilde{\pi}_y$$

$$= \frac{1}{m}\log \sum_{\sigma \in \Sigma_m} \exp\left(\frac{1}{2} \cdot \theta^T \tilde{\pi}_\sigma\right) - \frac{1}{m} \cdot \frac{1}{2} \cdot \theta^T \tilde{\pi}_y$$

$$= \frac{1}{m}\log \sum_{\sigma \in \Sigma_m} \exp\left(\frac{1}{2} \cdot \theta^T \tilde{\pi}_\sigma\right) + \frac{1}{m} \cdot \log\exp\left(-\frac{1}{2} \cdot \theta^T \tilde{\pi}_y\right)$$

$$= \frac{1}{m}\log \sum_{\sigma \in \Sigma_m} \exp\left(\frac{1}{2} \cdot \theta^T (\tilde{\pi}_\sigma - \tilde{\pi}_y)\right)$$

$$= \frac{1}{m}\log \sum_{\sigma \in \Sigma_m} \exp\left(-\frac{1}{2} \cdot \theta^T (\tilde{\pi}_\sigma + \tilde{\pi}_y)\right)$$

$$= \log(2) + \frac{1}{m}\log\frac{1}{2^m} \sum_{\sigma \in \Sigma_m} \exp\left(-\frac{1}{2} \cdot \theta^T (\tilde{\pi}_\sigma + \tilde{\pi}_y)\right)$$

$$= \log(2) + \frac{1}{m}\log\frac{1}{2^m} \sum_{\sigma \in \Sigma_m} \exp(-\theta^T \tilde{\pi}_\sigma)$$

$$= \log(2) + \frac{1}{m}\log F_{exp}^r\left(S, \theta, \sum_m\right).$$

It may be seen that there is a linear relationship between $F_{log}(S,\theta)$ and $F_{exp}^r(S,\theta,\Sigma_m)$. When $U \subseteq \Sigma_m$, the linear relationship between $F_{log}(S,\theta)$ and $F_{exp}^r(S,\theta,U)$ is still established and independent of σ. Therefore, θ that results in the least $F_{log}(S,\theta)$ is θ that results in the least $F_{exp}^r(S,\theta,U)$, that is, Equation 5 is established.

$$\text{argmin}_\theta F_{log}(S,\theta) = \text{argmin}_\theta F_{exp}^r(S,\theta U) \quad \text{Equation 5}$$

It may be concluded from the above reasoning process that training a binary classification model with a plurality of transform vectors π results in the same outcome model as training the binary classification model with original data.

Example 2: an m-dimensional vector w is generated, 0 or 1 is randomly determined as a value of each dimension of w, and $\Sigma_{i=1}^{m} w_i y_i x_i$ is determined as a transform vector π, where $w_i$ is the i-th dimension of the vector w. By repeating the above process n times, n transform vectors π may be obtained.

Since $w_i$ is either 0 or 1, the transform vector π may be a sum of yx of any 0 to m original samples. The value of y is not limited in Example 2.

Based on a reasoning process similar to that in Example 1, the same conclusion may be reached that training a binary classification model with a plurality of transform vectors π will result in the same outcome model as training the binary classification model with original data, and its reasoning process will not be elaborated again.

In step 120, the n transform vectors π are determined as training samples of a binary classification model. For example, the n transform vectors π are determined at a data provider.

Figure 2:
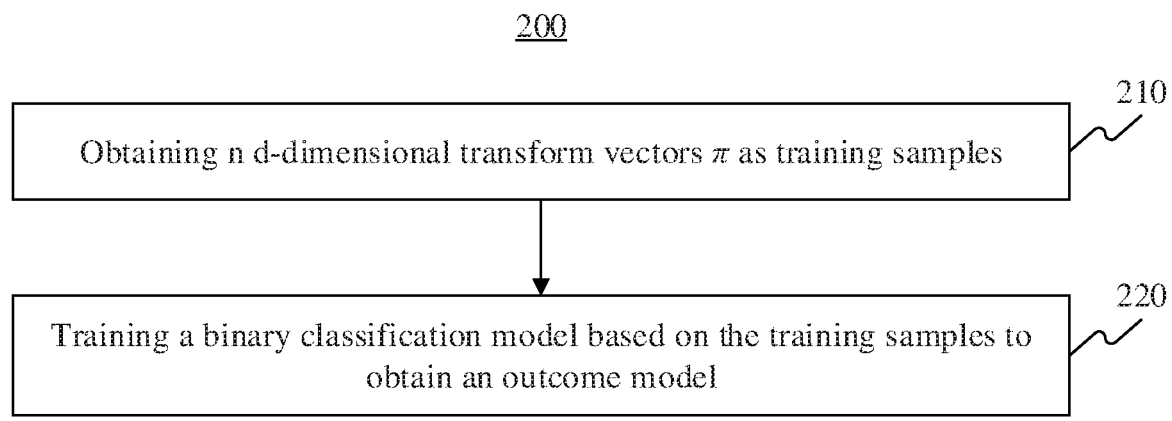
FIG. 2 is a flowchart of a privacy protection based binary classification model training method according to an embodiment.

FIG. 2 is a flowchart of a privacy protection based model training method 200, according to an embodiment.

In step 210, n d-dimensional transform vectors π are obtained as training samples, wherein each transform vector π is determined by a sum of yx of a plurality of randomly selected original samples, the original sample is one of m samples of the original data, and each original sample includes a d-dimensional original vector x and an output tag value y. For example, the n d-dimensional transform vectors π are obtained at a data miner.

The data provider outputs the training samples generated in the step 120 (FIG. 1) to the data miner. The data miner may obtain the training samples from the data provider in any manner, which is not limited in the embodiments of the present specification.

In step 220, based on the training samples, the binary classification model is trained to obtain an outcome model. For example, the binary classification model is trained at the data miner.

In the embodiment, after obtaining the training samples, the data miner trains the binary classification model with the training samples. Since the output tag values in the original data are already reflected in the transform vectors π and the training samples composed of n transform vectors π have no tag values, an unsupervised learning algorithm may be used for training to obtain an outcome model.

The binary classification model is not limited in the embodiments of the present specification; for example, a Boosting algorithm, an SGD (Stochastic gradient descent) algorithm, an SVRG (Stochastic variance reduced gradient) algorithm, an Adagrad (Adaptive Gradient) algorithm, etc. may be adopted.

In sonic embodiments, the manner in which training samples composed of n transform vectors π are trained by using a specific binary classification model is the same as that in the prior art. Training based on the Boosting algorithm is described below as an example, and other algorithms may be implemented with reference to this example, which will not be elaborated herein.

Initialization of the Boosting algorithm: let a sample space composed of n transform vectors π be: $g^r = \{\pi_1, \pi_2, \ldots, \pi_n\}$: the number T (T is a natural number) of iterations of the Boosting algorithm is preset; an initial value $\theta_0$ of a linear model θ is set to be a d-dimensional 0-vector; an initial value $\omega_1$ of an n-dimensional intermediate variable ω is set in such a way that the value in each dimension is equal to 1/n; and $\pi_{*k}$ is pre-calculated, where k is every natural number from 1 to d, and $\pi_{*k}$ is the maximum value of n transform vectors π in the k-th dimension.

The iteration process of the Boosting algorithm from Round 1 to Round T is as follows:

Let the current round of iteration be t, and for each dimension k of π, a calculation is performed as follows:

$$r_k = \frac{1}{\pi_{*k}} \sum_{j=1}^{n} \omega_j \pi_{jk};$$

k that results in the maximum $|r_k|$ (the absolute value of $r_k$) is denoted as ι(t), and $r_t$ and $\alpha_t$ are then calculated according to Equation 6 and Equation 7:

$$r_t = \frac{1}{\pi_{*i(t)}} \sum_{j=1}^{n} \omega_{tj} \pi_{ji(t)} \qquad \text{Equation 6}$$

$$\alpha_t = \frac{1}{2\pi_{*i(t)}} \log \frac{1 + r_t}{1 - r_t} \qquad \text{Equation 7}$$

The value of each dimension of the n-dimensional intermediate variable $\omega_{(t+1)}$ for the next round of iteration is then calculated according to Equation 8:

$$\omega_{(t+1)j} \leftarrow \omega_{tj} * \left( \frac{1 - \frac{r_t \pi_{ji(t)}}{\pi_{ji(t)}}}{1 - r_t^2} \right) \qquad \text{Equation 8}$$

In Equation 8, j is every natural number from 1 to n.

At the end of the iteration of the Round T, an outcome model $\theta_T$ of the training may be obtained according to Equation 9:

$$\theta_{Tk} = \Sigma_{t:\iota(t)=k} \alpha_t, \forall k \in [d] \qquad \text{Equation 9}$$

In Equation 9, $\theta_{Tk}$ is the k-th dimension of the d-dimensional vector $\theta_T$.

It may be seen that, in the embodiments of the present specification, n d-dimensional transform vectors π are randomly generated from m d-dimensional original vectors x and output tag values y, and each transform vector π is determined by a sum of a plurality of randomly selected yx; and binary classification model training is performed by using the n transform vectors π as training samples to obtain an outcome model consistent with that obtained through training with original data; therefore, it is extremely difficult to restore the original data due to adoption of multiple original samples and introduction of a random quantity during the generation of the transform vectors; moreover, the mining result consistent with that obtained by using the original data is obtained and information distortion is avoided.

The specific embodiments of the specification are described above. Other embodiments are within the scope of the appended claims. In some cases, the actions or steps recited in the claims may be performed in a different order than the embodiments and still achieve the desired results. In addition, the processes depicted in the figures are not necessarily in a particular order or in a sequential order to achieve the desired results. In some embodiments, multitasking processing and parallel processing are also possible or may be advantageous.

In an embodiment, the data provider entrusts the data miner to perform data mining for classification rules, and the data miner constructs a data classification rule based on a binary classification linear model. The data provider's original data $S = \{(x_i, y_i) | i = 1, 2, \ldots, m\}$, where $x_i \in R^d$ (i.e., $x_i$ is a d-dimensional vector), $y_i \in \{1, -1\}$ (i.e., the value of the output tag value $y_i$ is −1 or 1). Since the data provider's original data contains sensitive information about users, privacy protection is required.

Figure 3:
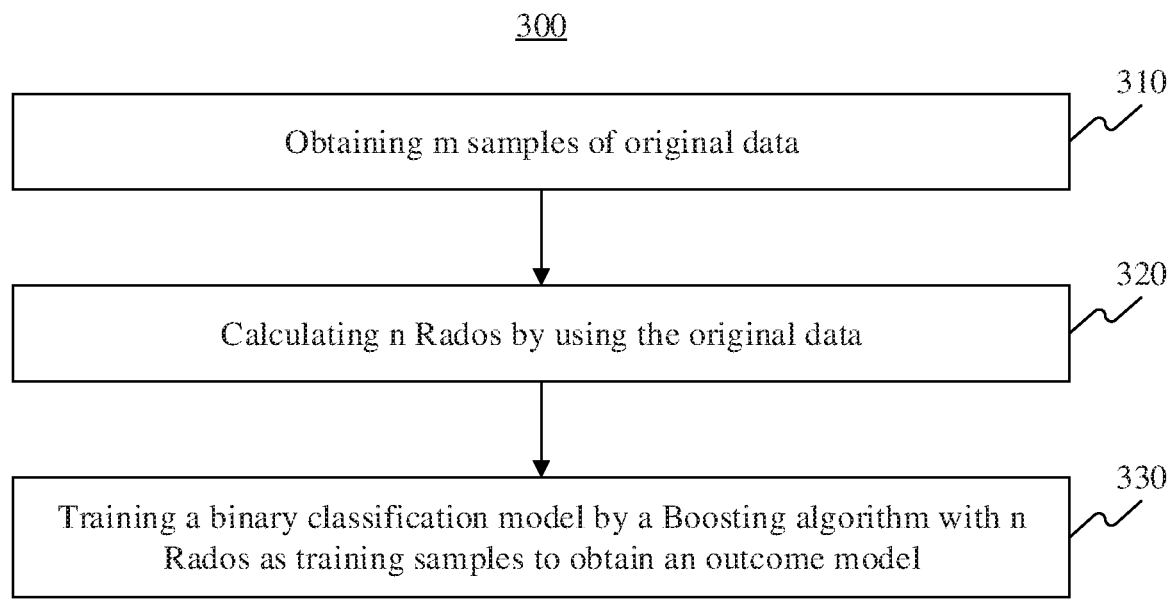
FIG. 3 is a flowchart of a data mining process according to an embodiment.

FIG. 3 is a flowchart of a classification data mining process 300 that can provide privacy protection, according to an embodiment.

In step 310, m samples of original data are obtained.

In step 320, n Rados (Rademacher Observatiot) are calculated by using the original data, For example, each Rado is a d-dimensional vector, denoted as $\pi_\sigma$, and is a transform vector in this embodiment.

Each Rado may be calculated in the following way: generating a m-dimensional vector σ, and randomly determining the value of each dimension of σ as −1 or 1; and determining a Rado corresponding to the σ, according to Equation 10:

$$\pi_\sigma = \tfrac{1}{2} \Sigma_{i=1}^{m} (\sigma_i + y_i) x_i, \sigma \varepsilon \Sigma_m = \{-1, +1\}^m \quad \text{Equation 10}$$

An example is described below for explanation: assuming that the original data has a total of 5 samples, each original vector x has four dimensions (m=4), and the original data is as shown in Table 1.

TABLE 1

| Sample No. | y | The first dimension | The second dimension | The third dimension | The fourth dimension |
|---|---|---|---|---|---|
| | | x | | | |
| 1 | 1 | 1 | 2 | 3 | 4 |
| 2 | −1 | 3 | 4 | 5 | 6 |
| 3 | −1 | 5 | 6 | 7 | 8 |
| 4 | 1 | 7 | 8 | 9 | 10 |
| 5 | 1 | 6 | 9 | 3 | 5 |

In the case of generation of one Rado, let the random value of the vector σ be σ={−1, 1, −1, 1, 1}, and then the value of each dimension of $\pi_\sigma$ is calculated according to Equation 10:

The first dimension: ½(1+(−1))*1+½(−1+1)*3+½((−1)+(−1))*5+½(1+1)*7+½(1+1)*6=8

The second dimension: ½(1+(−1))*2+½(−1+1)*4+½((−1)+(−1))*6+½(1+1)*8+½(1+10*9=11

The third dimension: ½(1+(−1))*3+½(−1+1)*5+½((−1)+(−1))*7+½(1+1)*9+½(1+1)*3=5

The fourth dimension: ½(1+(−1))*4+½(−1+1)*6+½((−1)+(−1))*8+½(1+1)*10+½(1+10*5=7

It may he concluded that one Rado is {8, 11, 5, 7}.

n vectors σ are randomly generated, then n Rados are obtained.

Steps 310 and 320 may ran on a device or logical node controlled by the data provider. The data provider may generate n Rados as data to be mined and provide them to the data miner.

In step 330, a binary classification model is trained by a Boosting algorithm with n Rados as training samples to obtain an outcome model.

The step 330 may run on a device or logical node controlled by the data provider. The data provider generates a multi-classification rule based on the binary classification linear outcome model obtained from the training and delivers it to the data miner. In some embodiments, the manner of transforming multiple binary classification linear outcome models into a multi-classification rule may be implemented by referring to the prior art, which will not be elaborated.

Corresponding to the foregoing process implementation, some embodiments of the present specification further provide a privacy protection based training sample generation device and a privacy protection based binary classification model training device. The devices may both be implemented by software, or hardware, or a combination of hardware and software.

Figure 4:
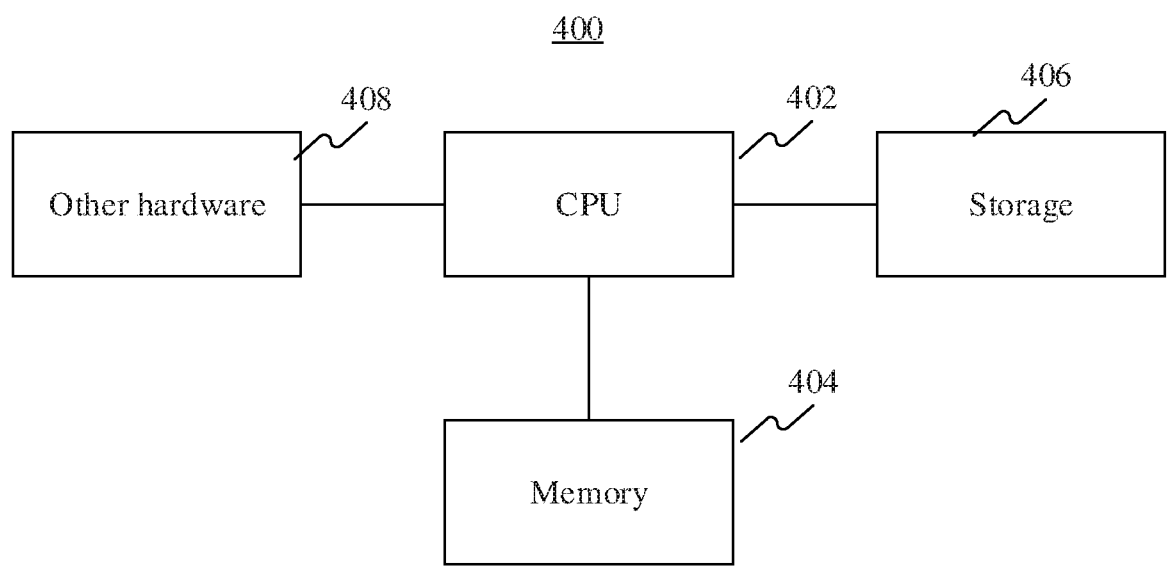
FIG. 4 is a block diagram of an electronic device according to an embodiment.

FIG. 4 is a block diagram of an electronic device 400, according to an embodiment. For example, the device 400 may be a privacy protection based training sample generation device configured to perform the above described methods 100 (FIG. 1) and 300 (FIG. 3), or a privacy protection based binary classification model training device configured to perform the above described method 200 (FIG. 2) and 300 (FIG. 3). Referring to FIG. 4, the device 400 may include a CPU (Central Process Unit) 402, a memory 404, a storage 406, and other hardware 408 such as a chip for transmitting and receiving wireless signals, a board card for implementing a network communication function, etc.

The CPU 402 may include one or more dedicated processing units, application-specific integrated circuits (ASICs), field-programmable gate arrays (FPGAs), or various other types of processors or processing units. The CPU 402 is coupled with the memory 404 and is configured to execute instructions stored in the memory 404 to perform the above described methods.

The memory 404 may include a non-permanent memory, a random access memory (RAM) and/or a non-volatile memory (such as a read-only memory (ROM) or a flash memory (flash RAM)), etc.

Figure 5:
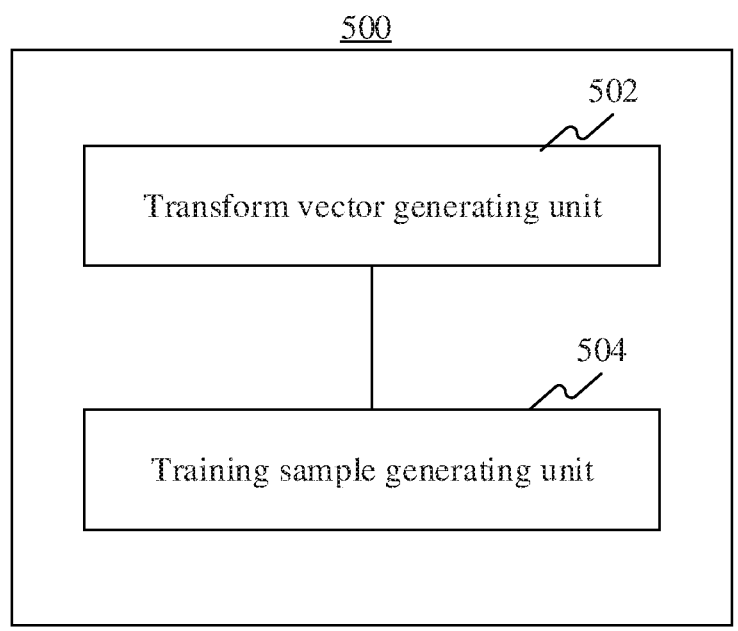
FIG. 5 is a block diagram of a privacy protection based training sample generation device according to an embodiment.

FIG. 5 is a block diagram of a privacy protection based training sample generation device 500 according to some embodiments of the present specification, where original data to be mined includes m original samples, each original sample comprises a d-dimensional original vector x and an output tag value y, and m and d are natural numbers. The device 500 may include: a transform vector generating unit 502 and a training sample generating unit 504, wherein the transform vector generating unit 502 is configured to generate n d-dimensional transform vectors π, and each transform vector π is determined by a sum of yx of a plurality of randomly selected original samples; and the training sample generating unit 504 is configured to determine the n transform vectors π as training samples of a binary classification model.

In an embodiment, the value of y is −v or v, and v is a real number; and the transform vector generating unit 502 is configured to: generate an m-dimensional vector σ, randomly determine −v or v as a value of each dimension of σ, and determine $\tfrac{1}{2}\Sigma_{i=1}^{m}(y_i + \sigma_i)x_i$ as a transform vector π, where $y_i$ is an output tag value of an i-th original sample, $x_i$ is an original vector of the i-th original sample, and $\sigma_i$ is the i-th dimension of the vector σ; and repeat the above process n times to obtain n transform vectors π.

In an embodiment, the transform vector generating unit 502 is configured to: generate an m-dimensional vector w, randomly determine 0 or 1 as a value of each dimension of w, and determine $\Sigma_{i=1}^{m} w_i y_i x_i$ as a transform vector π, where $w_i$ is the i-th dimension of the vector w, $y_i$ is an output tag value of an i-th original sample, and $x_i$ is an original vector of the i-th original sample; and repeat the above process n times to obtain n transform vectors π.

Figure 6:
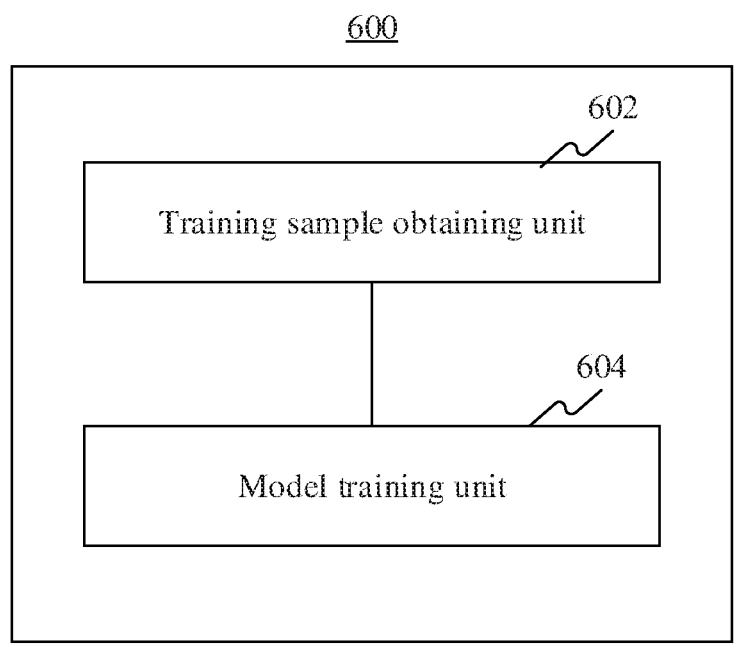
FIG. 6 is a block diagram of a privacy protection based model training device according to an embodiment.

FIG. 6 is a block diagram of a privacy protection based binary classification model training device 600 according to some embodiments of the present specification. The device 600 may include: a training sample obtaining unit 602 and a model training unit 604, wherein the training sample obtaining unit 602 is configured to obtain n d-dimensional transform vectors π as training samples, wherein each transform vector π is determined by a sum of yx of a plurality of randomly selected original samples, the original sample is one of m samples of the original data, each original sample includes a d-dimensional original vector x and an output tag value y, and m and d are natural numbers; and the model training unit 604 is configured to train a binary classification model based on the training samples to obtain an outcome model.

In an embodiment, the binary classification model includes: a Boosting algorithm, an SGD algorithm, an SVRG algorithm, or an Adagrad algorithm.

Some embodiments of the present specification provide a computer device including a memory and a processor. The memory herein stores a computer program executable by the processor; and when the processor runs the stored computer program, the privacy protection based training sample generation method 100 (FIG. 1) is performed. For a detailed description of the steps of the privacy protection based training sample generation method 100, a reference may be made to the previous content, and it will not be elaborated again.

Some embodiments of the present specification provide a computer device including a memory and a processor. The memory herein stores a computer program executable by the processor; and when the processor runs the stored computer program, the privacy protection based binary classification model training method 200 (FIG. 2) is performed. For a detailed description of the steps of the privacy protection based binary classification model training method 200, a reference may be made to the previous content, and it will not be elaborated again.

Some embodiments of the present specification provide a computer readable storage medium which stores computer programs, and when the computer programs are run by a processor, the privacy protection based training sample generation method 300 (FIG. 3) is performed. For a detailed description of the steps of the privacy protection based training sample generation method 300, a reference may be made to the previous content, and it will not be elaborated again.

Some embodiments of the present specification provide a computer-readable storage medium which stores computer programs, and a processor may run the computer programs to implement the above described method 100, 200, or 300.

Computer-readable storage media include both permanent and non-persistent, removable and non-removable media and may store information by any method or technology. The information may be a computer-readable instruction, a data structure, a module of a program or other data. Examples of computer-readable storage media include, but are not limited to, a phase change memory (PRAM), a static random access memory (SRAM), a dynamic random access memory (DRAM), other types of random access memory (RAM), a read only memory (ROM), an electrically erasable programmable read-only memory (EEPROM), a flash memory or other memory technologies, a read-only optical disk read-only memory (CD-ROM), a digital versatile disc (DVD) or other optical storages, a magnetic tape cassette, a magnetic disk storage or other magnetic storage devices or any other non-transmission medium for storing information that may be accessed by computing devices. As defined herein, the computer readable media do not include transitory media, such as modulated data signals and carriers.

Each of the above described units may be implemented as software, or hardware, or a combination of software and hardware. For example, each of the above described units may be implemented using a processor executing instructions stored in a memory. Also, for example, each of the above described units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

It is also to be understood that the term "comprise," "include" or any of other variants thereof is intended to cover non-exclusive inclusions such that a process, method, article, or device that includes a series of elements not only includes those elements but also includes other elements that are not listed explicitly, or also includes inherent elements of this process, method, article, or device. In the absence of more restrictions, an element defined by the sentence "including a/an . . . " does not preclude additional identical elements existing in the process, method, article or device that includes the element.

Those skilled in the art should appreciate that embodiments of the present specification may be provided as a method, system, or computer program product. Accordingly, the embodiments of the present specification may take the form of an entirely hardware embodiment, an entirely software embodiment, or an embodiment combining software and hardware. Moreover, the embodiments of the present specification may take the form of a computer program product implemented on one or more computer usable storage media (including, but not limited to, disk memories, CD-ROMs and optical memories) comprising computer usable program codes.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A privacy protection based training method, comprising:

generating, by a processor, n d-dimensional transform vectors from original data to be mined, wherein the original data is generated from Internet-based activities and comprises m original samples, each original sample comprises a d-dimensional original vector x and an output tag value y, m and d being natural numbers, and each transform vector π is determined by a sum of yx of a plurality of original samples randomly selected from the m original samples, wherein the generating the n d-dimensional transform vectors π comprises one of:

in a first process, generating an m-dimensional vector σ, randomly determining −v or v as a value of each dimension of σ, wherein the value of y is −v or v, and v is a real number, and determining $\frac{1}{2}\sum_{i=1}^{m}(y_i+\sigma_i)x_i$ as a transform vector π, wherein $y_i$ is an output tag value of an i-th original sample, $x_i$ is an original vector of the i-th original sample, and $\sigma_1$ is the i-th dimension of the vector σ; and repeating the first process n times to obtain n transform vectors π; or in a second process, generating an m-dimensional vector w, randomly determining 0 or 1 as a value of each dimension of w, and determining $\sum_{i=1}^{m} w_i y_i x_i$ as a transform vector π, wherein $w_i$ is an i-th dimension of the vector w, $y_i$ is an output tag value of an i-th original sample, $x_i$ is an original vector of the i-th original sample; and repeating the second process n times to obtain n transform vectors π;

determining, by the processor, the n d-dimensional transform vectors π as training samples of a binary classification model; and training, by the processor, the binary classification model based on the training samples to obtain an outcome model for further data mining from the Internet-based activities.

2. A privacy protection based training device, comprising:
a processor; and
a memory for storing instructions executable by the processor;
wherein the processor is configured to:
generate n d-dimensional transform vectors π from original data to be mined, wherein the original data is generated from Internet-based activities and comprises m original samples, each original sample comprises a d-dimensional original vector x and an output tag value y, m and d being natural numbers, and each transform vector π is determined by a sum of yx of a plurality of original samples randomly selected from the m original samples, wherein in generating the n d-dimensional transform vectors π, the processor is further configured to perform one of:

in a first process, generating an m-dimensional vector σ, randomly determining −v or v as a value of each dimension of σ, wherein the value of y is −v or v, and v is a real number, and determining $½\Sigma_{i=1}^{m}(y_i+\sigma_i)x_i$ as a transform vector π, wherein $y_i$ is an output tag value of an i-th original sample, $x_i$ is an original vector of the i-th original sample, and σ is the i-th dimension of the vector σ; and repeating the first process n times to obtain n transform vectors π; or in a second process, generating an m-dimensional vector w, randomly determining 0 or 1 as a value of each dimension of w, and determining $\Sigma_{i=1}^{m} w_i y_i x_i$ as a transform vector π, wherein $w_i$ is an i-th dimension of the vector w, $y_i$ is an output tag value of an i-th original sample, $x_i$ is an original vector of the i-th original sample; and repeating the second process n times to obtain n transform vectors π;

determine the n transform vectors π as training samples of a binary classification model; and train the binary classification model based on the training samples to obtain an outcome model for further data mining from the Internet-based activities.

3. A non-transitory computer-readable storage medium storing thereon a computer program that, when executed by a processor of a device, causes the device to perform a privacy protection based training method, the method comprising:

generating n d-dimensional transform vectors π from original data to be mined, wherein the original data is generated from Internet-based activities and comprises m original samples, each original sample comprises a d-dimensional original vector x and an output tag value y, m and d being natural numbers, and each transform vector π is determined by a sum of yx of a plurality of original samples randomly selected from the m original samples, wherein the generating the n d-dimensional transform vectors π comprises one of:

in a first process, generating an m-dimensional vector σ, randomly determining −v or v as a value of each dimension of σ, wherein the value of y is −v or v, and v is a real number, and determining $½\Sigma_{i=1}^{m}(y_i+\sigma_i)x_i$ as a transform vector π, wherein $y_i$ is an output tag value of an i-th original sample, $x_i$ is an original vector of the i-th original sample, and $\sigma_1$ is the i-th dimension of the vector σ; and repeating the first process n times to obtain n transform vectors π; or in a second process, generating an m-dimensional vector w, randomly determining 0 or 1 as a value of each dimension of w, and determining $\Sigma_{i=1}^{m} w_i y_i x_i$ as a transform vector π, wherein $w_i$ is an i-th dimension of the vector w, $y_i$ is an output tag value of an i-th original sample, $x_i$ is an original vector of the i-th original sample; and repeating the second process n times to obtain n transform vectors π;

determining the n d-dimensional transform vectors π as training samples of a binary classification model; and training the binary classification model based on the training samples to obtain an outcome model for further data mining from the Internet-based activities.

* * * * *